Figure 1:
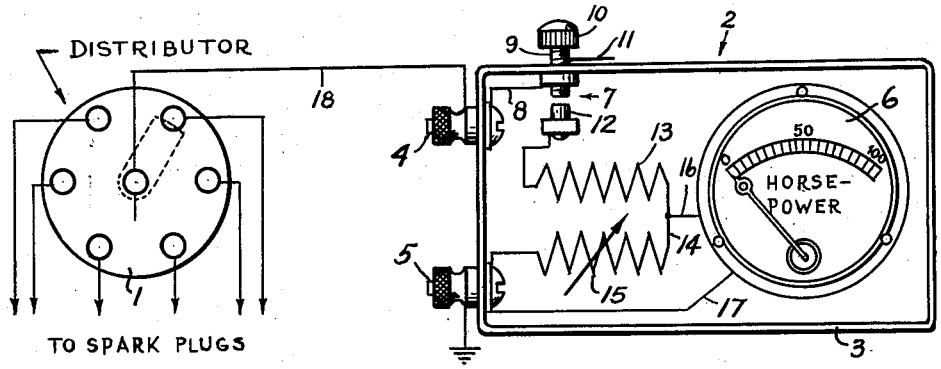

Sept. 29, 1953     C. R. GIBSON     2,653,472

POWER INDICATING INSTRUMENT

Filed March 6, 1950

Inventor

CHARLES R. GIBSON

By Elizabeth Newton Dew

Attorney

Patented Sept. 29, 1953

2,653,472

UNITED STATES PATENT OFFICE 2,653,472

POWER INDICATING INSTRUMENT

Charles R. Gibson, Richmond, Va.

Application March 6, 1950, Serial No. 147,868

9 Claims. (Cl. 73—116)

1

This invention relates to means for determining the power output of internal combustion engines of the type wherein the explosive charge is ignited by a high-voltage spark.

It is well known that engines such as those used at the present time in motor vehicles and aircraft, operating upon the Otto cycle, are throttled or controlled as to power output, by varying the compression of the explosive charge. That is, at low power outputs, the explosive charge in a cylinder at the beginning of the compression stroke, is below atmospheric so that a portion of the compression stroke is used to bring the pressure of the combined charge up to atmospheric. At the other extreme, with fully open throttle, the explosive charge at the beginning of the compression stroke, is substantially at atmospheric pressure. Thus, the pressure of the explosive mixture at the instant it is ignited by the spark from the engine's ignition system, is a direct function of the power output of the engine.

It is also well known that the power output of an internal combustion engine of the type under discussion is also directly proportional to the speed of the engine, that is, the power output is proportional to the number of explosions per unit time and, of course, to the number of high voltage pulses in the ignition system of the engine. It is also a well known fact that the high tension voltage necessary to create a spark at the gap of the spark plugs of such an engine, is directly proportional to the compression. Since the ignition is timed to occur at the instant the piston is at or near top dead center on the compression stroke, this voltage is also directly proportional to the power output of the engine, or in the case of a multi-cylinder engine, to the power output of any selected cylinder thereof.

Furthermore, for any given engine, the average current in the high voltage circuit of its ignition system will be proportional to the number of explosions or pulses of current per unit time.

It is therefore the main object of my invention to provide an instrument whereby the principles explained in the preceding paragraphs are utilized to register the instantaneous power output of an engine of the type mentioned.

More particularly, it is an object of the invention to provide an instrument wherein the instantaneous high tension voltage is combined with or multiplied by the average current in the high voltage circuit, to give an EI factor proportional to the power being developed.

Another object is to provide an instrument which, when used with a multi-cylinder engine, may be associated with the distributor lead of the engine's ignition system, to give an indication of the power output of the engine or, alternatively, with the individual high voltage lead to any individual cylinder thereof, to give an indication of the power output of any selected cylinder or of each cylinder in succession.

A still further object is to provide an instrument as aforesaid which is relatively simple and inexpensive to construct and apply and which is versatile in use in that it has a wide range of applications and uses in the testing of internal combustion engines.

A further object is to provide an instrument which may be adapted as a permanent installation in connection with the engine or engines of an automotive vehicle or aircraft, or with a stationary power plant. Alternatively, the invention may be embodied as a portable testing instrument for temporary connection with an engine as an aid to mechanics in detecting trouble in individual cylinders of the engine, or in the ignition thereof, or in the general tuning of an engine to maximum efficiency.

Yet another object is to provide an instrument which is highly reliable in operation, which when embodied as a mechanic's aid, can be very quickly attached and detached and adjusted either to each cylinder of a multi-cylinder engine in succession or to give a reading of the power output of all the cylinders combined.

Other objects and advantages will be apparent from a study of the following specification in connection with the accompanying drawing wherein—

Figure 2:
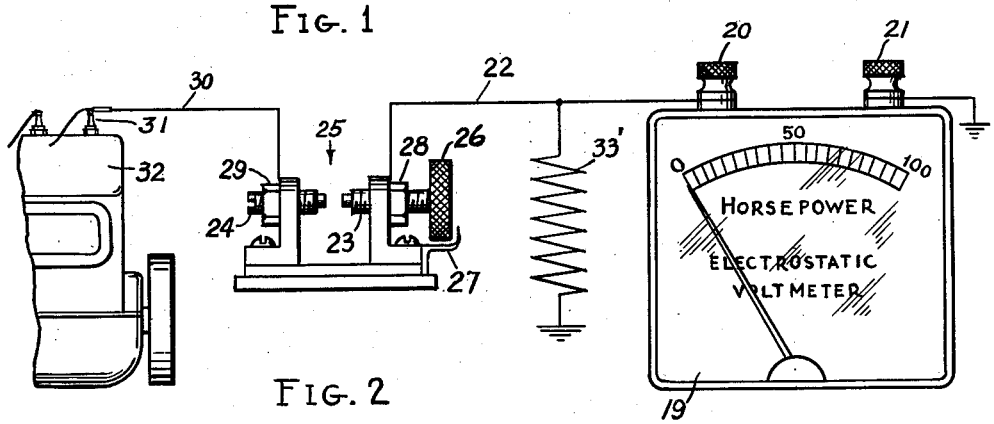
Figure 3:
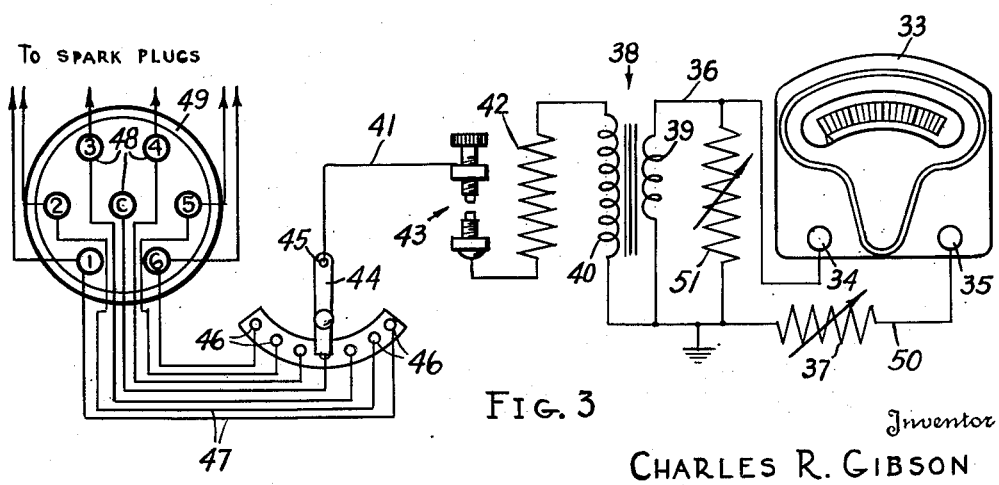

Figure 1 is a diagrammatic view of a form of the invention using a micro-ammeter as the power indicator connected to the distributor arm terminal, Figure 2 is a diagrammatic view of a second form of the invention employing an electrostatic voltmeter as the power indicator and connected with one cylinder of a multi-cylinder engine, and Figure 3 is a diagrammatic view of a third and preferred form, using an A. C. voltmeter as the indicator and showing how the instrument may be connected at will to give the power being generated by each individual cylinder, in succession, or by all of the cylinders in combination.

Referring in detail to Figure 1 of the drawing, 1 identifies the distributor cap of the ignition system of an internal combustion engine exemplarily shown as having six cylinders. The instrument of the invention, identified in general at 2, is shown in the form of a portable casing 3 which may be of plastic or other dielectric material having external binding posts 4 and 5 carried by one wall. A microammeter 6 of conventional construction is positioned within the casing in position so that its dial and indicating hand are viewable through an opening in the casing's cover, not shown. Terminal 4 is connected by lead 8 inside the casing with a screw or element 9 threaded through one wall of casing 3 having an adjusting knob 10, and forming one element of a spark gap 7. If desired a pointer 11 may be attached to element 9 for angular movement over a scale, not shown, carried on or formed in the external wall of the casing to give the length of the spark gap in thousandths of an inch, for example. The remaining element 12 of spark gap 7, is connected with one terminal of a resistor 13 whose other terminal is connected by a lead 14 with one terminal of a calibrating resistor 15 having its other terminal connected to binding post 5. One lead 16 from meter 6 is connected to the common terminal of resistors 13 and 15. The remaining lead 17 from meter 6 is connected to binding post 5 which, as shown, is grounded. A typical value for spark gap 7 is 0.03 inch. Resistor 13 which may have a value of 1.5 megohms, acts to limit the current drawn from the high tension system. Resistor 15, which may be variable, is used to calibrate the instrument to provide full scale deflection of microammeter 6 when full power is being developed by the engine or individual cylinders thereof under test. A lead 18 is shown as extending from binding post 4 to the center or distributor arm terminal of distributor 1.

The instrument in Figure 1 is shown as a portable test device. In using this instrument, the binding posts 4 and 5 are connected by suitable wires with the distributor arm terminal and the cylinder block, crankcase of the engine, or in the case of automotive vehicles, with the frame of the vehicle. Spark gap 7 is adjusted to have the same value as that of the spark plugs of the engine being tested. In the manner of use being described, it is assumed that the user will know (1) the approximate setting of resistor 15 which will give full scale deflection of the pointer of meter 6 when that particular motor is developing maximum power and (2) the proper setting of the resistor to give full-scale deflection when the instrument is connected to one cylinder only of the engine operating at maximum power. This information can be obtained either from actual test or from a previously-prepared chart or table.

While there are many possible ways in which the instrument may be used to conduct a test, a suggested manner would be first to clip lead 18 to the center terminal of the engine's distributor cap or to the high tension terminal at the coil and note the deflection of the pointer of instrument 6 at full throttle. In case the pointer is at or near full deflection under this condition, the engine is known to be in satisfactory operating condition. However, failure to obtain full deflection will indicate trouble. Lead 18 is then clipped in succession to the terminals of cap 1 leading to the respective cylinders to thereby test each cylinder separately. If the trouble is confined to any one cylinder, that cylinder can be immediately identified by a failure of the pointer to deflect to the same extent as when the other cylinders are tested, under like conditions of load. If the pointer deflection of all cylinders is substantially the same for like load conditions, then the trouble is known to be a general one such as sticking valves or leaky intake manifold. The tests may be conducted either in the garage, hangar, on the road or in the air, as desired. Only a brief trial run under any given condition or in testing any one cylinder is sufficient and, with a reasonable amount of experience, a mechanic can become extremely skilled and proficient in quickly and accurately isolating and diagnosing any trouble causing inefficient operation. Furthermore, the instrument readings are of value even although meter 6 may not be accurately calibrated for the particular engine being tested. Thus, if one cylinder gives noticeably less pointer deflection than the others under like load conditions, it is known that that cylinder is the source of trouble.

The instrument of my invention is of equal or greater utility when applied as a permanent attachment to the engine of an automotive vehicle, aircraft or motorboat. When applied to an automobile or truck, the instrument 6 will be mounted in convenient view of the driver and will then have lead 18 connected to the center or distributor-arm terminal of the cap 1, as shown upon Figure 1. The instrument is then calibrated, as previously described, to give full scale deflection when the engine is developing maximum power. Then, when the driver wishes to obtain maximum economy and efficiency in operating his vehicle, the instrument becomes a constant reminder of uses of excessive horsepower. Using the indications of the instrument in conjunction with the speedometer enables the driver to determine efficient operating speeds. Furthermore, after learning the average horsepower required to operate the vehicle at a given rate of speed, a change in the horsepower indicated at that speed under similar road conditions will indicate trouble before it might otherwise become apparent. Many other ways of employing the instrument and interpreting its indications will occur to the user.

In the species of Figure 2, I have shown an electrostatic voltmeter 19 having one binding post 21 grounded and the other, 20, connected by lead 22 to one threaded element 23 of a spark gap 25. This element may have an adjusting knob 26 with radial graduations, not shown, to cooperate with an indicator 27 giving, in thousandths of an inch, for example, the separation of the points. The other element 24 of gap 25 may be threaded as shown and both elements may be locked in position by nuts 28 and 29. Element 24 is connected by lead 30 with one spark plug 31 of an internal combustion engine 32. Lead 22 is grounded through a resistor 33' in order to reduce the value of current through the instrument to the proper value. Resistor 33' may be variable, if desired, for purposes of calibration. It will be understood that this form of the invention may be embodied as described in connection with Figure 1, either as a portable instrument for temporary attachment to the ignition system of an engine, or as a permanent attachment wherein meter 19 may be mounted in view of the driver of an automotive vehicle or the pilot of an aircraft. It will also be understood that lead 30 may be connected to the distributor arm terminal or lead of the engine's ignition system to give an indication of power being developed by the entire engine.

In Figure 3 there is shown a third form of the invention using an A. C. meter 33 having terminals 34 and 35. Terminal 34 is connected by lead 36 with one terminal of the secondary 39 of a transformer 38. The primary 40 of transformer 38 has one terminal connected by lead 41, resistor 42 and spark gap 43, in series, with the arm 44 of a selector which may be pivoted at 45 to make contact with any one of a series of terminals 46. Each terminal is connected by a respective lead 47 with a corresponding terminal 48 of distributor cap 49. A common lead 50 connects meter terminal 35 through a variable resistor 37 with the remaining terminals of transformer coils 39 and 40, to ground. A second variable resistor 51 may be connected in shunt across the secondary of transformer 38. In calibrating the instrument accurately to correctly reflect peak horsepower with decrease in reading above rated speed, it is desirable to use two resistors as shown on certain engines. By this hook-up, after adjustment and calibration, each cylinder may be tested in succession merely by swinging arm 44 over the several contacts 46, or the entire engine may be tested when the arm is on the central one of the contacts in the position shown in the figure.

In all species, it will be clear that the indication of the instrument will be directly proportional to the product of the voltage necessary to cause a spark at the gaps of the spark plugs of the engine and the average current therethrough. Since these variables are proportional to the maximum compression and the number of explosions per unit time, respectively, which in turn, determine the power developed, it follows that the instrument is based upon correct operating principles and when calibrated will give reliable and accurate absolute measurements of power. Thus the meters, as shown, may be graduated in terms of horsepower. It has also been shown that the instruments readings are valuable on a relative basis. The instrument where of the portable type may be quickly attached and detached and in all types, its indications are substantially instantaneous so that only a short time is required for a test. I would particularly like to point out that only two electrical connections are required for a given test and that there are required no mechanical or electrical changes whatever in an existing aircraft or motor vehicle. Of course, the selective switch 44, 46 of Figure 3, may be omitted if desired, in which case, the lead 41 would be connected directly to any selected one of the distributor or spark plug terminals. As with the species of Figures 1 and 2, the form of the invention shown at Figure 3 may be embodied either in portable form as a mechanic's aid, or as a permanent attachment for use by the operator of the engine.

In the claims, the term "dimension" as used in connection with the spark gap, means the separation of the points of the gap. Where a meter of great sensitivity and small inertia is used, it may be suitably damped in order to render it insensitive to individual pulses of current and to cause it to respond to the average value of current only.

It is understood that when the term A. C. meter is used it includes a D. C. meter with either halfwave or fullwave rectifier.

Having now fully disclosed my invention, what I claim and desire to secure by Letters Patent is:

1. In combination with the high tension ignition system of an internal combustion engine said system including a spark plug in each cylinder and a rotary high voltage ignition distributor connected with said plugs in succession, of an electric meter having first and second terminals and an indicator responsive to the voltage drop across said terminals, a spark gap, and a lead from said first terminal to a high tension terminal of said distributor and including said spark gap, said gap having a dimension substantially the same as the spark gap of the plugs of said engine, the second terminal of said meter being grounded.

2. The combination with the ignition distributor arm terminal of an internal combustion engine, of a circuit having one end connected with said distributor arm terminal and the other end grounded, of a spark gap, a resistor and a current indicating instrument in said circuit in series.

3. The combination as recited in claim 2, said instrument being a microammeter, and a variable resistor connected in shunt with said instrument.

4. The combination with the ignition distributor terminals of an internal combustion engine, of means adapted with any selected one of said terminals to form a circuit between said selected terminal and ground, and a spark gap and electrostatic voltmeter connected in series in said circuit, said spark gap being adjustable, and a resistor connected in shunt with said electrostatic voltmeter.

5. In combination with the high tension terminals of the ignition distributor of a multicylinder internal combustion engine, a circuit including a spark gap, a first resistor and the primary of a step-down transformer, in series, an A. C. current responsive indicator connected in series with the secondary of said transformer, and means operable selectively to connect said circuit with any one of said high tension distributor terminals.

6. In a power indicator for a multi-cylinder internal combustion engine having a high tension distributor terminal for each cylinder of the engine and a distributor arm terminal, a selector switch having a plurality of contacts and a switch arm movable to selectively engage said contacts in succession, means electrically connecting each distributor terminal with a respective contact, a spark gap, a step-down transformer, first circuit means connecting said switch arm, spark gap and the primary of said transformer in series, an A. C. meter, and second circuit means connecting said meter and the secondary of said transformer, in series.

7. In a power indicator for an internal combustion engine, a casing having first and second insulated terminals in one wall thereof, an adjustable spark gap in said casing, first and second resistors mounted in said casing, a current-responsive meter carried by said casing, first circuit means connecting said terminals and including said spark gap, first resistor and meter, in series, a variable calibrating resistor connected in shunt between said meter and second terminal, and means operable externally of said casing to vary the size of said spark gap.

8. In a power meter, a first terminal for electrical connection with a high tension terminal of the distributor of the ignition system of an internal combustion engine and a second terminal to be grounded, a current-measuing device, a spark gap, a resistor, and a conductor having its ends connected with said terminals, respectively, and connecting said device, spark gap and resistor in series.

9. A power meter for multicylinder combustion engines having a spark ignition system comprising, a circuit including a spark gap, a first resistor and the primary of a step-down transformer, in series, an A. C. current responsive indicator connected in series with the secondary of said transformer, and means operable selectively to connect said circuit with any one of the high tension distributor terminals of an engine under test.

CHARLES R. GIBSON.

References Cited in the file of this patent

UNITED STATES PATENTS

| Number | Name | Date |
| --- | --- | --- |
| 2,052,952 | Thomas | Sept. 1, 1936 |
| 2,241,731 | Mitchell | May 13, 1941 |